Oct. 12, 1954   E. A. KANN   2,691,179
PNEUMATIC STRUCTURE FOR MATTRESSES, SEAT
AND BACK CUSHIONS, AND THE LIKE
Filed May 25, 1951   4 Sheets-Sheet 1
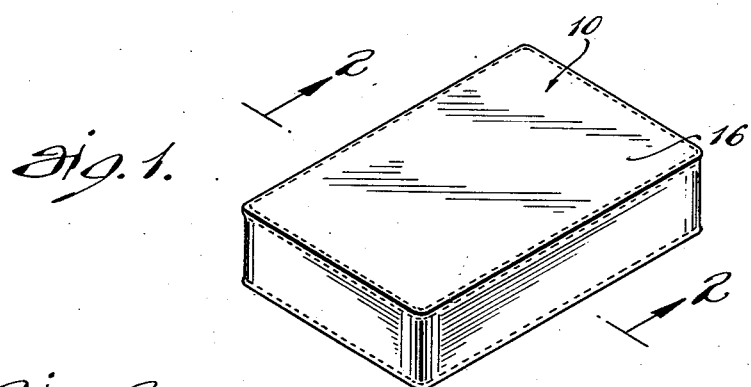
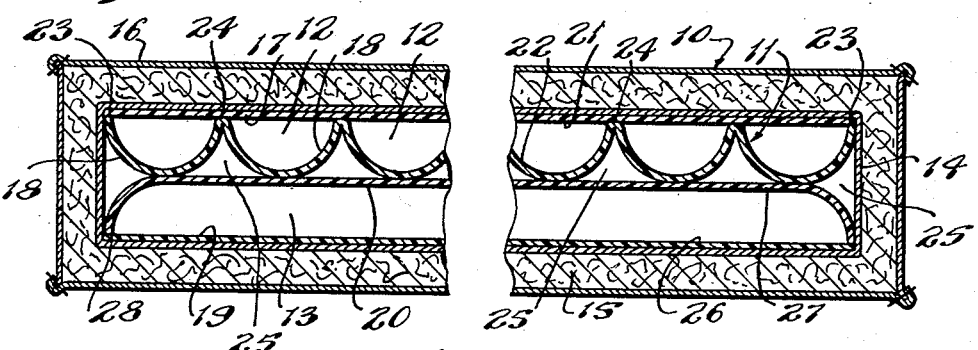
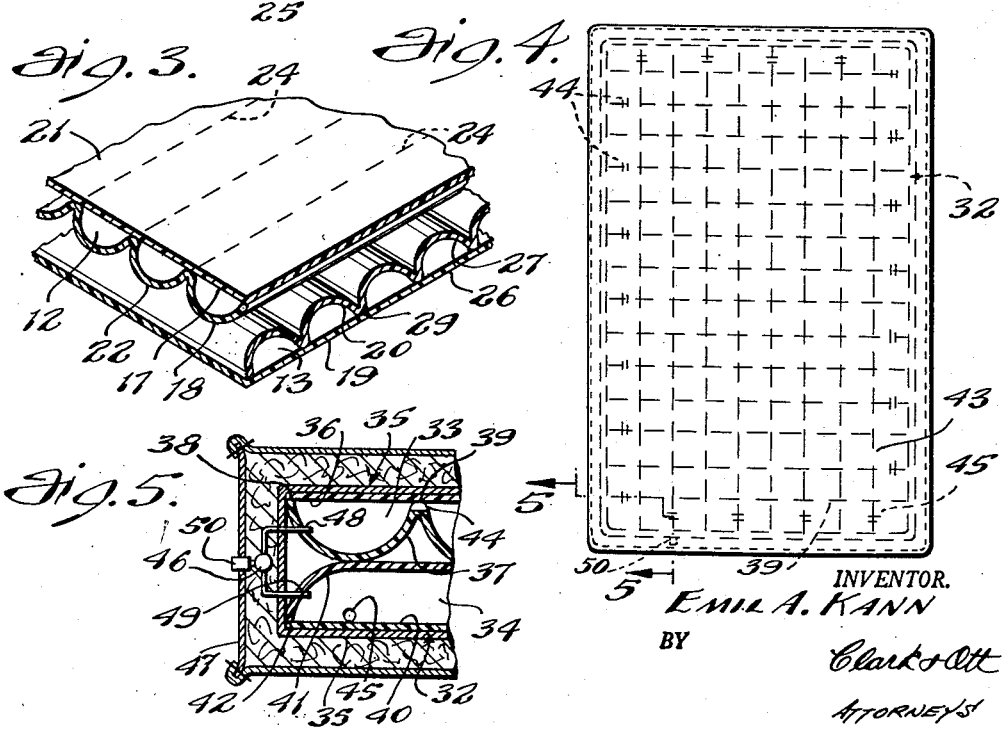
INVENTOR.
EMIL A. KANN
BY
Clark & Ott
ATTORNEYS

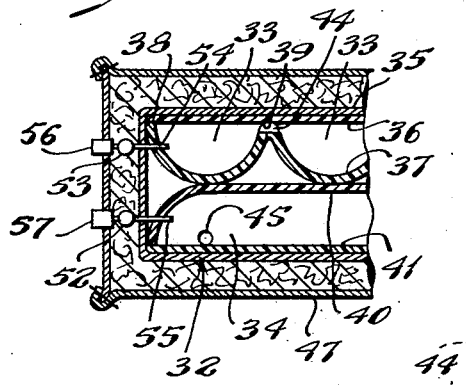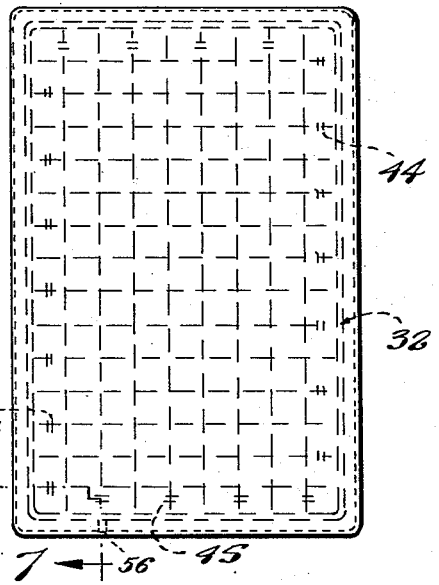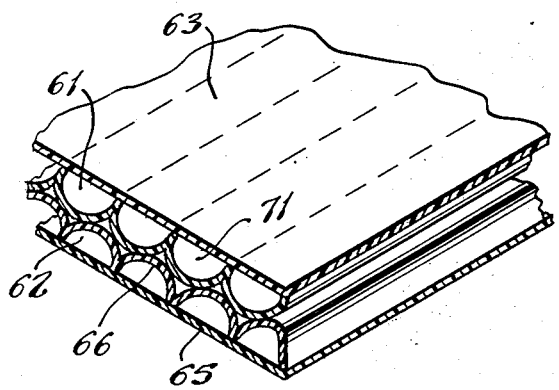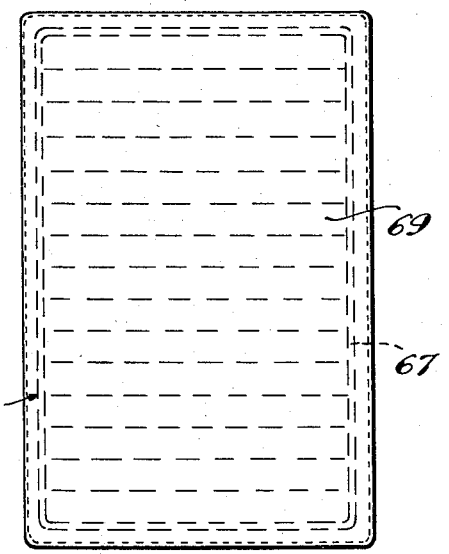
INVENTOR.
EMIL A. KANN.
BY Clark + Ott
ATTORNEYS Oct. 12, 1954  E. A. KANN  2,691,179
PNEUMATIC STRUCTURE FOR MATTRESSES, SEAT
AND BACK CUSHIONS, AND THE LIKE
Filed May 25, 1951  4 Sheets-Sheet 3
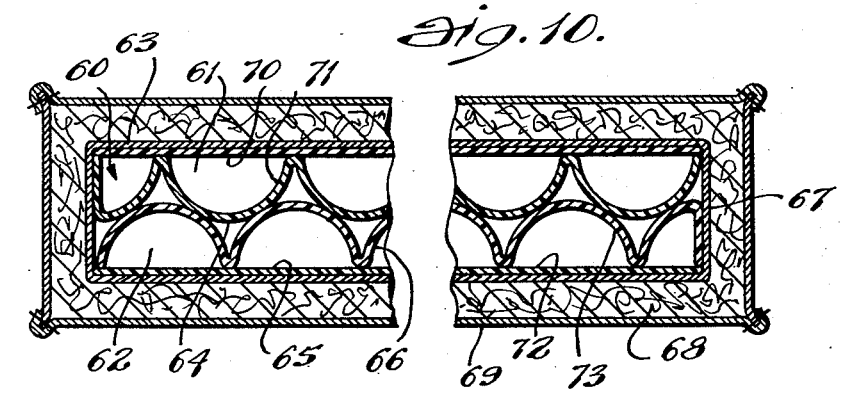
Fig. 10.
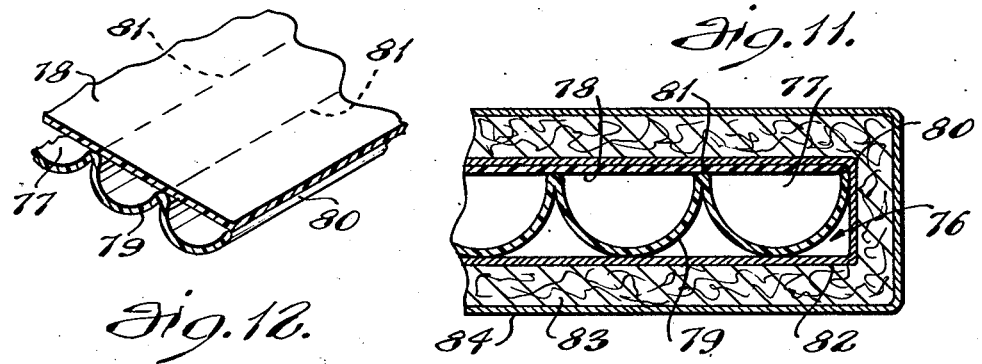
Fig. 11.
Fig. 12.
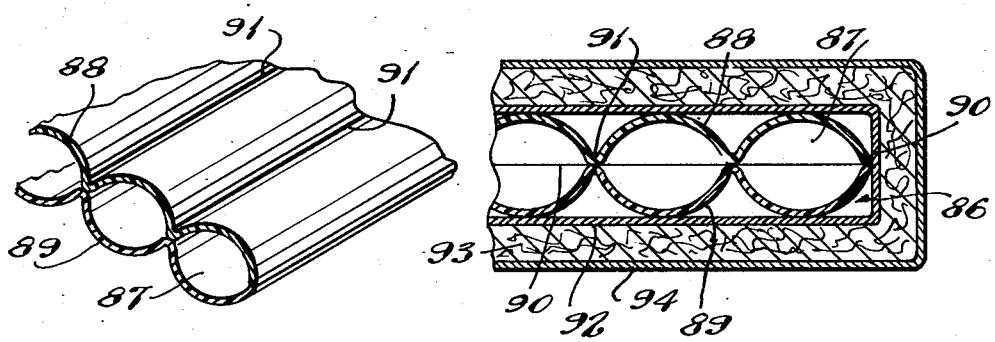
Fig. 14.
Fig. 13.
INVENTOR.
Emil A. Kann
BY Clark & Ott
ATTORNEYS Oct. 12, 1954 — E. A. KANN — 2,691,179
PNEUMATIC STRUCTURE FOR MATTRESSES, SEAT
AND BACK CUSHIONS, AND THE LIKE
Filed May 25, 1951 — 4 Sheets-Sheet 4
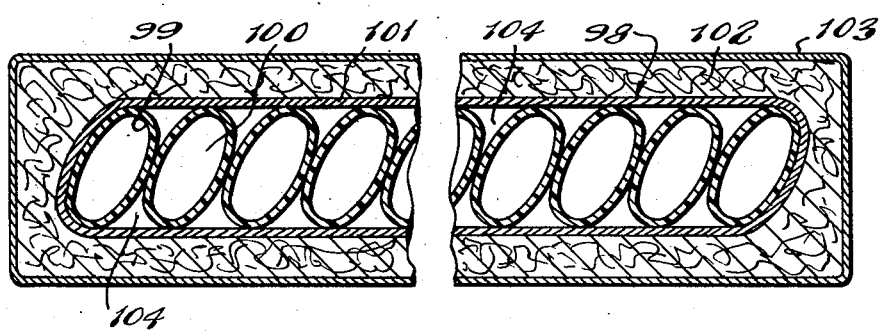
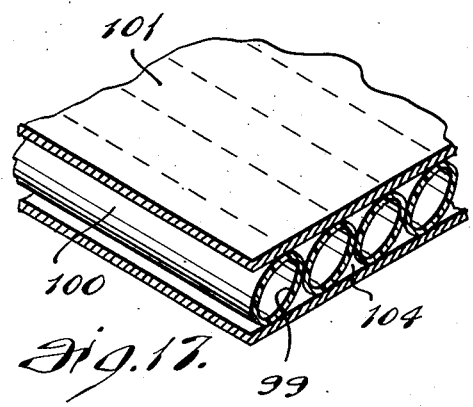
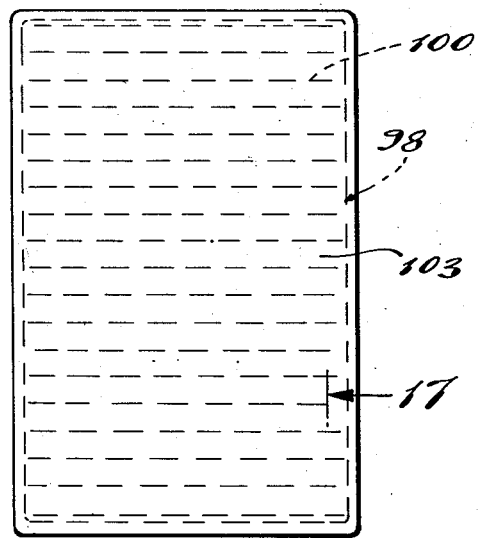
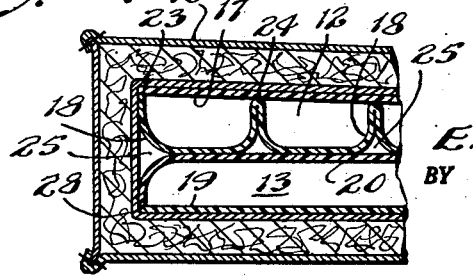
INVENTOR.
EMIL A. KANN
BY
Clark & Ott
ATTORNEYS Patented Oct. 12, 1954

2,691,179

UNITED STATES PATENT OFFICE 2,691,179

PNEUMATIC STRUCTURE FOR MATTRESSES, SEAT AND BACK CUSHIONS, AND THE LIKE

Emil A. Kann, Kew Gardens Hills, N. Y., assignor to The Englander Company, Inc., Chicago, Ill., a corporation of Delaware Application May 25, 1951, Serial No. 228,271

4 Claims. (Cl. 5—348)

This invention relates to improvements in mattresses, seat and back cushions and the like and has particular reference to a pneumatic structure which forms a resilient and compressible foundation therefor.

An object of the invention is to provide a pneumatic structure composed of a plurality of elongated air impervious bodies forming cells extending from one side of the mattress to the other in side by side relation and arranged within a flexible casing to permit of the independent flexing of a wall portion of each of the cell bodies when pressure is applied thereon to thereby provide a compressible pneumatic structure.

Still another object of the invention is to provide a pneumatic structure composed of a plurality of elongated cells adapted to contain a fluid such as air for maintaining the same in expanded relation and which cells are so constructed as to provide a substantially plane or flat top wall extending continuously throughout the extent of the pneumatic structure whereby mattresses, seat and back cushions and the like provided with pneumatic structures of said character have smooth or plane top walls without appreciable unevenness resulting from the cellular formation of the pneumatic structure, and the individual cells cannot be felt or detected through the top thereof.

Still another object of the invention is to provide a pneumatic structure in which the cells are formed by sheets of air impervious material, which sheets are secured together at their ends and in longitudinally extending transversely spaced locations providing parallel rows of cells with the inner sheet arranged in undulating formation providing arcuate or rounded inner walls in cross-sectional configuration and with the outer sheet providing substantially smooth or plane outer walls. The outer sheet forms the upper wall of the pneumatic structure when a single layer of cells is employed in the mattress, seat and back cushions and the like, and when a plurality of layers of cells is employed, the inner or undulating walls are superimposed and the mattress or seat and back cushions may be disposed with either side uppermost or outermost.

Still another object of the invention is to provide a pneumatic structure composed of a plurality of cells arranged in superimposed layers and with crevices or spaces between adjacent cells within the pneumatic structure whereby the inner walls of the cells are free to flex with the pressure or weight imposed thereon so as to provide a resilient and compressible foundation for a mattress, seat and back cushions and the like.

Still another object of the invention is to provide a pneumatic structure which may be inflated as desired so as to maintain the desired pressure of the fluid therein.

With the foregoing and other objects in view, reference is now made to the following specification and accompanying drawings in which the preferred embodiments of the invention are illustrated.

In the drawings:

Fig. 1 is a perspective view of a mattress provided with a pneumatic structure constructed in accordance with the invention and forming the foundation thereof.

Fig. 2 is an enlarged transverse sectional view taken approximately on line 2—2 of Fig. 1 with a portion thereof broken away.

Fig. 3 is a fragmentary perspective view of a corner portion of the pneumatic structure with the longitudinal and transverse rows of cells shown in section.

Fig. 4 is a top plan view of a mattress provided with a pneumatic structure embodying a modified form of the invention.

Fig. 5 is an enlarged fragmentary sectional view taken approximately on line 5—5 of Fig. 4.

Fig. 6 is a top plan view of a mattress provided with a pneumatic structure embodying another form of the invention.

Fig. 7 is an enlarged fragmentary sectional view taken approximately on line 7—7 of Fig. 6.

Fig. 8 is a top plan view of a mattress provided with a pneumatic structure embodying still another form of the invention.

Fig. 9 is a fragmentary perspective sectional view of a corner portion of the pneumatic structure with the rows of cells shown in section.

Fig. 10 is an enlarged sectional view through a mattress provided with a pneumatic structure embodying an adaptation of the invention with the cells in the superimposed layers arranged in parallel relation.

Fig. 11 is an enlarged fragmentary sectional view of a mattress provided with a pneumatic structure having a single row of cells and illustrating a modified form of the invention.

Fig. 12 is a fragmentary perspective sectional view of a corner portion of the pneumatic structure with the cells shown in section.

Fig. 13 is an enlarged fragmentary sectional view of a mattress provided with a pneumatic structure embodying still another form of the invention.

Fig. 14 is a fragmentary perspective sectional view of a corner portion of the pneumatic structure with the cells shown in section.

Fig. 15 is a top plan view of a mattress provided with a pneumatic structure embodying still another form of the invention.

Fig. 16 is an enlarged vertical sectional view taken approximately on line 16—16 of Fig. 15.

Fig. 17 is an enlarged fragmentary perspective sectional view of a corner portion of the pneumatic structure with the cell bodies shown in section.

Fig. 18 is a fragmentary sectional view similar to Fig. 2 of the drawings, illustrating the tubular bodies defining the cells in compressed deformed condition.

Referring to the drawings by characters of reference, the invention is shown in its application to a mattress, but it is to be understood that the same is applicable to upholstery generally and may be utilized in seat and back cushions and the like as well as mattresses.

In the form of the invention illustrated in Figs. 1 to 3 inclusive of the drawings, the mattress 10 includes a pneumatic structure 11 consisting of upper and lower superimposed rows of cells 12 and 13 arranged with the cells in one row extending transversely of the cells in the other row and the rows of cells being enclosed within a rectangular shaped flexible casing 14. The pneumatic structure 11 forms a resilient and compressible foundation within the mattress 10 and is surrounded on all sides by a soft, compressible filling material 15 which is encased within the usual outer ticking 16.

The cells 12 in the upper row are formed with plane or substantially flat outer walls 17 and an arcuate or rounded inner wall 18, while the cells 13 in the lower row are similarly formed with a plane or substantially flat outer wall 19 and a rounded or arcuate inner wall 20. Each of the rows of cells is preferably fashioned from two sheets of flexible air impervious material such as rubberized sheeting, vinyl resin plastic or equivalent synthetic plastic material and the like. Thus the upper row of cells is formed from an outer sheet 21 and an inner sheet 22 which are arranged with the inner sheet disposed in undulating formation and secured at its edges as at 23 and by air tight seams 24 to the inner face of the outer sheet continuously throughout one dimension of the outer sheet whereby a row or plurality of air tight cells 12 are provided which are closed at their ends. Similarly the lower row of cells 13 is formed from an outer sheet 26 and an inner sheet 27 which are arranged with the inner sheet disposed in undulating formation and secured by air tight seams 29 to the inner face of the outer sheet continuously about the four side edges thereof as at 28 and in equally spaced parallel rows or locations extending continuously throughout one dimension of the outer sheet whereby a row or plurality of air tight cells 13 are provided which are closed at their ends.

The undulating formation of the inner sheets 21 and 26 provides spaces or interstices 25 between adjacent cells and between adjacent rows of cells within the pneumatic structure whereby the inner walls 18 and 20 of the cells are free to flex so as to take up some of the space between adjacent cells with the imposition of pressure or weight on the mattress to thereby compress with the weight and form a resilient and comfortable mattress which will return to normal formation when the pressure is removed since the inner walls 18 and 20 will return to normal formation with the removal of the pressure on the mattress.

In this form of the invention, the cells 12 and 13 in the upper and lower rows are entirely closed so as to prevent the passage of air from one cell to the other. In the form of the invention illustrated in Figs. 4 and 5 however, and in the form illustrated in Figs. 6 and 7, the cells are in communication to permit of the passage of air from one cell to the other and means is provided for inflating the cells as desired. As illustrated in the embodiments shown in these forms of the invention, the pneumatic structure 32 consists of upper and lower rows of cells 33 and 34 which are arranged with the cells in one row extending transversely of the cells in the other row and the rows of cells are enclosed within a flexible casing 35. The cells 33 in the upper row are similarly formed of outer and inner sheets 36 and 37 of air impervious material, which sheets are secured together at their edges as at 38 and intermediate their edges as at 39 to form the rows of cells, while the lower row of cells is formed of outer and inner sheets 40 and 41 which are secured together about their peripheries as at 42 and intermediate thereof as at 43 to form the cells 34.

In order to permit of the passage of air from one cell to the other throughout the upper and lower rows, adjacent cells are provided with communicating passageways 44 and 45 at the ends thereof extending through the seams 39 in the upper row and through the seams 43 in the bottom row respectively. The openings through adjacent seams are at the opposite ends of the rows so as to provide a tortuous path for the flow of fluid through the several cells in each row. In the form shown in Figs. 4 and 5, an air valve 46 is provided which is located between the flexible casing 35 and the outer ticking 47 with individual tubes 48 and 49 extending from the valve and opening into one of the cells 33 in the upper row and one of the cells 34 in the lower row. The valve 46 is provided with an inlet 50 protruding through the side wall of the ticking 47 and which is adapted to receive a hose connection from a hand pump and the like for inflating the cells, it being understood that the valve is of the normally closed type and is opened by pressure of the pump. In the form shown in Figs. 6 and 7, two air valves 52 and 53 are provided, each having individual tubes 54 and 55 extending into the cells 33 and 34 respectively in the upper and lower rows and with inlets 56 and 57 protruding through the side wall of the ticking 47.

In accordance with the invention the pneumatic structure may also consist of upper and lower rows of cells arranged with the cells in the upper and lower rows disposed in parallel relation as illustrated in Figs. 8, 9 and 10 of the drawings. In this form of the invention the pneumatic structure is indicated generally by the reference character 60 and includes a row of upper cells 61 and a row of lower cells 62 disposed in superimposed parallel relation, the cells 61 in the upper row each having a substantially flat or plane outer wall 63 and a rounded or arcuate inner wall 64 while the cells 52 in the lower row each have a flat or plane outer wall 65 and an arcuate or rounded inner wall 66. The pneumatic structure 60 is enclosed within a flexible casing 67 which is surrounded by a soft compressible filling 68 enclosed within an outer ticking 69. As in the previous forms of the invention, the upper row of cells 61 are formed from outer and inner sheets 70 and 71 while the lower row of cells 62 are formed from outer and inner sheets 72 and 73.

For certain types of upholstery, such as seat and back cushions a single row of cells preferably may be employed, as illustrated in the forms shown in Figs. 11 and 12, and 13 and 14. In the form shown in Figs. 11 and 12, the pneumatic structure 76 includes a row of cells 77 which are produced from upper and lower sheets 78 and 79 of air impervious material which are secured together continuously about their peripheries as at 80 and in spaced rows as at 81 extending throughout the area of the sheets. The pneumatic structure 76 is encased in a flexible casing 82 which is surrounded by soft compressible filling 83 and enclosed in an outer casing 84 such as an upholstery covering.

As illustrated in the form shown in Figs. 13 and 14, the pneumatic structure 86 consists of a plurality of rows of cells 87 which are formed from upper and lower sheets of air impervious material 88 and 89 secured together at their peripheries as at 90 and at laterally spaced locations or rows 91 extending throughout the area of the sheets. In this form of the invention the upper and lower sheets 88 and 89 are each of undulating formation and are enclosed within a flexible casing 92 which is surrounded by a soft compressible filling 93 enclosed within a casing 94 such as upholstery material.

It is to be understood that all of the aforesaid forms of the invention include a flexible casing with air impervious bodies forming cells extending from one side of the mattress to the other in side by side relation arranged in said casing and that portions of the cell bodies are of bowed or curved formation in cross-section to provide crevices or spaces between adjacent cells so that the bowed or curved portions thereof are free to flex when pressure is imposed thereon so as to provide a compressible pneumatic structure.

The form of the invention illustrated in Figs. 15 to 17 inclusive is also constructed to permit of the independent flexing of the cell bodies. In this form of the invention, the pneumatic structure 98 consists of a plurality of air impervious elongated tubular bodies 99 forming air cells 100 which are arranged in side by side relation and extend from one side of the mattress to the other within a flexible casing 101. The tubular bodies 99 are of elliptical formation with the axes thereof inclined to the horizontal so that each cell body is imposed on the cell body to the right thereof at the side and with crevices or spaces 104 between adjacent cells above and below the engagements of the cell bodies with each other. The pneumatic structure 98 is surrounded by soft compressible filling material 102 with a ticking or upholstery covering 103 enclosing the same.

In the several forms of the invention, the tubular bodies defining the cells will deform with the weight or pressure imposed thereon so as to take up the crevices or spaces between adjacent cells to thereby provide a resilient and comfortable mattress. For instance, the rounded inner walls 18 of the upper row of cells 12 in the form of the invention illustrated in Figs. 1 to 3 inclusive of the drawings, will be compressed or flattened as illustrated in Fig. 18 of the drawings to lessen the crevices or spaces 25 therebetween, and the inner wall 20 of the lower row of cells 13 will be similarly flattened or compressed to take up the crevices 25 therebetween whereby the mattress structure 11 will be inherently capable of conforming to the contour of the body imposed on the mattress so as to render the mattress resilient and comfortable.

While several forms of the invention have been illustrated in the drawings, it is to be understood that the invention is not so limited and the same is intended to cover all such constructions as fall within the purview thereof.

What is claimed is:

1. In a pneumatic structure for mattresses and the like, upper and lower rows of elongated cells of semi-cylindrical formation arranged with the cells in each row connected together in side by side relation and disposed with the upper row of cells superimposed upon the lower row and the cells in the upper row extending at right angular relation with the cells in the lower row and the rows of cells disposed parallel with the upper and lower faces of the mattress, said upper row of cells each having a substantially flat upper wall and a uniformly bowed lower wall in cross-section throughout its length with the upper and lower walls secured together to close the cells at the ends thereof, and said lower row of cells each having a substantially flat lower wall and a uniformly bowed upper wall in cross-section throughout its length with the upper and lower walls of said bottom row secured together to close the ends of the cells thereof.

2. In a pneumatic structure for mattresses and the like, upper and lower rows of elongated cells of semi-cylindrical formation arranged with the cells in each row connected together in side by side relation and disposed with the upper row of cells superimposed upon the lower row and the cells in the upper row extending at right angular relation with the cells in the lower row and the rows of cells disposed parallel with the upper and lower faces of the mattress, said upper row of cells each having a substantially flat upper wall and a uniformly bowed lower wall in cross-section throughout its length with the upper and lower walls secured together to close the cells at the ends thereof, said lower row of cells each having a substantially flat lower wall and a uniformly bowed upper wall in cross-section throughout its length with the upper and lower walls of said bottom row secured together to close the ends of the cells thereof, and a flexible casing enclosing the upper and lower rows of cells.

3. In a pneumatic structure for mattresses and the like, upper and lower rows of elongated cells arranged with the cells in each row connected together in side by side relation and disposed with the upper row of cells superimposed upon the lower row of cells and the cells in the upper row extending transversely of the cells in the lower row and the rows of cells disposed parallel with the upper and lower faces of the mattress, said upper row of cells each having a substantially flat upper wall and a bowed lower wall in cross-section throughout its length, and said lower row of cells each having a substantially flat lower wall and a bowed upper wall in cross-section throughout its lentgh.

4. In a pneumatic structure for mattresses and the like, upper and lower rows of elongated cells arranged with the cells in each row connected together in side by side relation and disposed with the upper row of cells superimposed upon the lower row and with the rows of cells disposed parallel with the upper and lower faces of the mattress, said upper row of cells each having a substantially flat upper wall and a bowed lower wall in cross-section throughout its length and said lower row of cells each having a substantially flat lower wall and a bowed upper wall in cross-section throughout its length, and adjacent bowed walls in the upper row of cells and adjacent bowed walls in the lower row of cells having communicating passageways to permit of the passage of air from one cell to the other throughout the upper and lower rows.

References Cited in the file of this patent

UNITED STATES PATENTS

| Number | Name | Date |
|---|---|---|
| 2,028,060 | Gilbert | Jan. 14, 1936 |
| 2,495,124 | Morner | Jan. 17, 1950 |

FOREIGN PATENTS

| Number | Country | Date |
|---|---|---|
| 787,263 | France | July 1, 1935 |